UNITED STATES PATENT OFFICE.

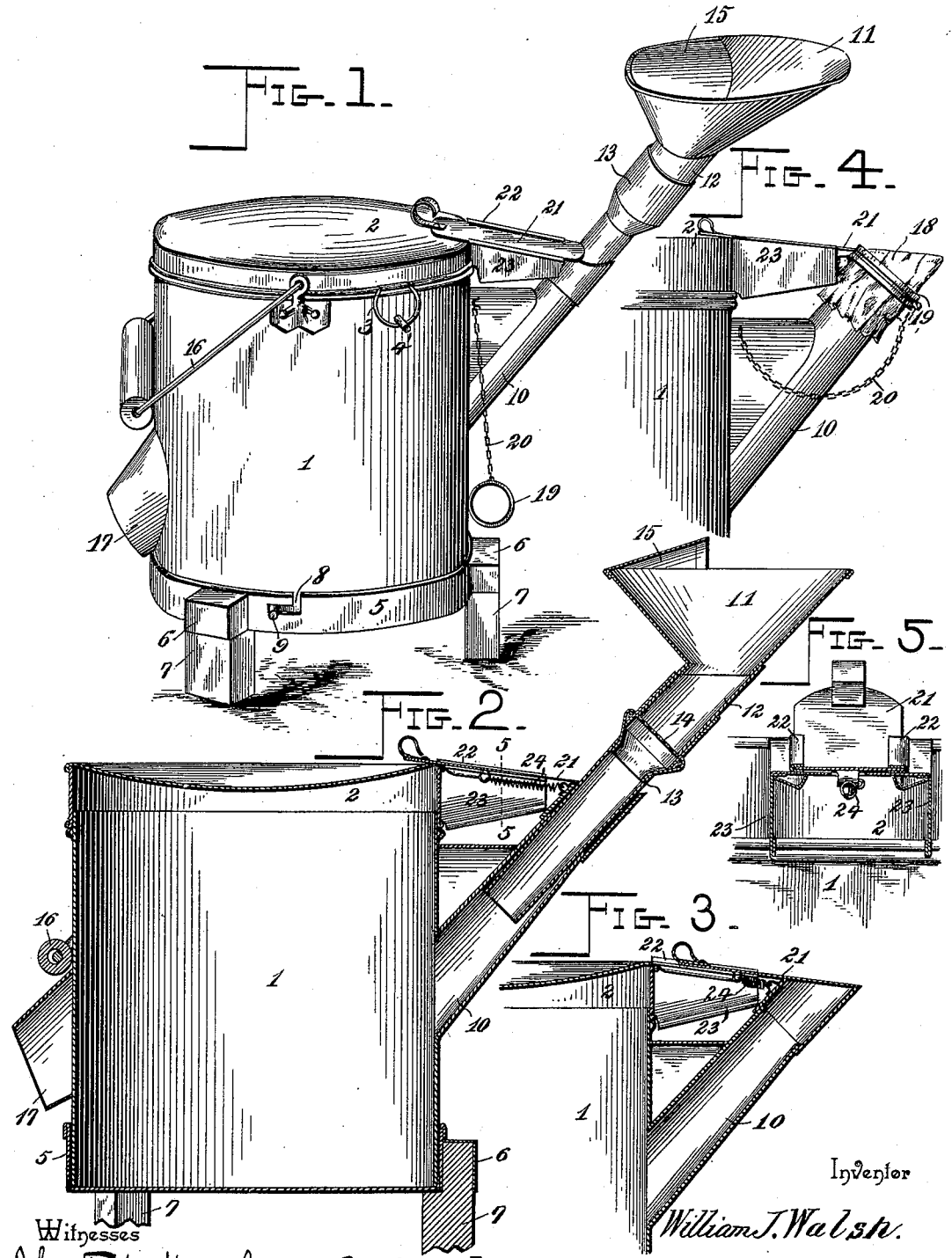

WILLIAM J. WALSH, OF CLEVELAND, TENNESSEE.

MILK-BUCKET.

SPECIFICATION forming part of Letters Patent No. 594,127, dated November 23, 1897.

Application filed July 21, 1897. Serial No. 645,434. (No model.)

*To all whom it may concern:*

Be it known that I, WILLIAM J. WALSH, a citizen of the United States, residing at Cleveland, in the county of Bradley and State of Tennessee, have invented a new and useful Milk-Bucket, of which the following is a specification.

The invention relates to improvements in milk-buckets.

The object of the present invention is to improve the construction of that class of milk-buckets which afford a seat for the milker and to provide a simple and inexpensive device for automatically closing the spout of the bucket should the latter upset and the funnel become displaced.

The invention consists in the construction and novel combination and arrangement of parts, as hereinafter fully described, illustrated in the accompanying drawings, and pointed out in the claims hereto appended.

In the drawings, Figure 1 is a perspective view of a milk-bucket constructed in accordance with this invention. Fig. 2 is a vertical sectional view of the same. Fig. 3 is a detail sectional view taken longitudinally of the spring-actuated slide. Fig. 4 is a detail view of the spout, the funnel being removed therefrom and a strainer-cloth being arranged thereon. Fig. 5 is a detail sectional view on the line 5 5 of Fig. 2.

Like numerals of reference designate corresponding parts in the several figures of the drawings.

1 designates a cylindrical bucket provided with a cover or lid 2, having a dished or concave upper face, forming a seat for the operator, and the lid or cover is secured upon the bucket by depending hinged rings or loops 3, which engage lugs or projections 4 of the bucket and which are located at opposite sides thereof.

At the bottom of the bucket is arranged a detachable ring or band 5, provided at intervals with sockets 6, which receive the upper ends of supporting-legs 7, adapted to arrange the bucket at a sufficient elevation to suit the operator and enable him to occupy an easy position in milking. The legs also hold the bucket clear of the ground, and the ring or band is provided at opposite sides with L-shaped slots 8, having vertical and horizontal branches and detachable engaging pins or projections 9, which extend horizontally from opposite sides of the bucket. In applying the legs to the bucket the pins or projections 9 are introduced into the vertical branches of the slots and are then carried into the horizontal branches by partially rotating the ring or band.

Projecting upwardly from the front of the bucket and disposed at an inclination is a spout 10, terminating adjacent to the upper face of the lid and having its upper edges disposed at a slight inclination. The milk-bucket is adapted to receive a funnel 11, consisting of a bowl, a short depending tube 12, and a coupling-tube 13, which is provided with upper and lower portions of different diameters, the upper portion being larger and adapted to receive the short tube 12 and the lower portion being of a diameter to fit within the spout 10. The short tube 12 is provided at its bottom with a strainer 14, composed of a foraminous disk, and the bowl of the funnel is provided at the inner side with a guard or shield 15 to prevent milk from splashing over the operator.

The bucket is provided with a swinging bail 16 and has a fixed handhold 17 at its back to assist in tilting it. The spout after the funnel is removed is adapted to receive a strainer-cloth 18, as illustrated in Fig. 4 of the accompanying drawings, and a ring 19 is provided for securing the strainer-cloth to the spout. The ring 19, which is connected with the bucket by a chain 20, is adapted to be slipped over the strainer-cloth after the latter has been placed upon the upper end of the spout.

In order to prevent milk from spilling out of the spout should the bucket be overturned and the funnel become displaced, the lid is provided with a spring-actuated slide 21, disposed in the same plane as the upper edges of the spout and adapted to automatically cover the same when it is free to move. The slide 21, which is provided at its inner end with a handle, is mounted in suitable ways 22 of a support 23, and a spring 24, which is arranged beneath the slide, is connected with the same and with a spout at the inner side thereof. The spring is distended when the slide is drawn inward to permit the funnel to be arranged in the spout, as illustrated in Fig.

2 of the accompanying drawings, and as soon as the spout is removed the spring contracts and causes the slide to close the upper end of the spout. The support 23 consists of a pair of angle-plates secured to and projecting from the lid in the direction of the spout and provided at their tops with the said ways 22.

The advantages of the invention are as follows: The lid or cover, which forms a seat for the milker, is securely fastened to the bucket, so that it cannot become accidentally displaced, and the slide, which is spring-actuated, is adapted to close the mouth of the spout automatically should the bucket be upset and the funnel come out.

What I claim is—

1. The combination with a milk-bucket having a spout, of a spring-actuated slide mounted on the bucket and covering the upper end of the spout, said slide being adapted to be withdrawn from over the spout to permit a funnel to be arranged therein and being capable of automatically closing the same when the funnel is removed, substantially as described.

2. The combination of a milk-bucket having a spout, a support mounted on the lid and extending in the direction of the spout, and provided with ways, a slide arranged in said ways and extending over the mouth of the spout and closing the same, and a spring connected with the slide for holding the same normally over the spout, substantially as described.

In testimony that I claim the foregoing as my own I have hereto affixed my signature in the presence of two witnesses.

WILLIAM J. WALSH.

Witnesses:
 T. I. SHAW,
 E. J. WINRIGHT.